United States Patent [19]

Walker et al.

[11] 4,251,763
[45] Feb. 17, 1981

[54] COMMUTATING CAPACITOR CHARGE DETECTION CIRCUIT AND METHOD

[75] Inventors: Loren H. Walker, Salem; John H. Cutler, Roanoke, both of Va.

[73] Assignee: General Electric Company, Salem, Va.

[21] Appl. No.: 32,938

[22] Filed: Apr. 24, 1979

[51] Int. Cl.$^3$ .............................................. H02P 5/40
[52] U.S. Cl. .................................. 318/803; 318/810; 363/58; 363/138
[58] Field of Search ............................ 318/798–803, 318/810, 811; 363/58, 138

[56] References Cited

U.S. PATENT DOCUMENTS

| | | | |
|---|---|---|---|
| 3,887,862 | 6/1975 | Hübner | 318/803 |
| 4,028,600 | 6/1977 | Blaschke et al. | 318/803 |
| 4,039,926 | 8/1977 | Steigerwald | 363/138 |
| 4,066,938 | 1/1978 | Turnbull | 318/803 |
| 4,183,081 | 1/1980 | Cutler et al. | 363/58 |

*Primary Examiner*—Gene Z. Rubinson
*Attorney, Agent, or Firm*—Arnold E. Renner

[57] ABSTRACT

A circuit and method is disclosed for detecting the presence of charges of appropriate magnitude and polarity on commutating capacitors of an inverter that converts a DC output current to a drive current of variable magnitude and frequency for driving an AC electric motor producing controllable rotation and torque. The presence of charges of appropriate magnitude and polarity is detected by measuring the voltages across the conduction controlled rectifying devices in the inverter. In addition, the existence of conduction controlled rectifying devices in the conducting state is determined by measuring the magnitude of the DC output current. An output signal is generated when the charges of appropriate magnitude and polarity are detected, which output signal is effective to allow the inverter to generate normal drive current. The absence of the output signal is effective to force the magnitude of the DC output current below a predetermined magnitude value and is effective to prevent the sequencing of gating signals to the inverter, whereby the drive current is such that the motor produces substantially zero rotation at substantially zero torque.

20 Claims, 3 Drawing Figures

COMMUTATING CAPACITOR CHARGE DETECTION CIRCUIT AND METHOD

BACKGROUND OF THE INVENTION

1. Field of the Invention

The present invention relates generally to control systems for inverters for conversion of electric power and, more particularly, to an apparatus and method for detecting the presence of charges of appropriate magnitude and polarity on the commutating capacitors of an inverter of the type that converts an incoming DC signal to a drive current of variable current magnitude and frequency, and for providing an output signal when the appropriate charges are detected which is effective to control the generation of the drive current.

2. Prior Art

Variable frequency inverters are well known for converting an incoming DC signal from a DC source to an outgoing AC signal of variable magnitude and frequency in accordance with gating control signals provided to the inverter.

There are many types of variable frequency inverters. One of these is the controlled current inverter, which is supplied with an incoming DC current signal of variable magnitude and generates therefrom a drive current of variable magnitude and frequency in accordance with gating control signals supplied to the controlled current inverter. Such a controlled current inverter has been used in AC electric motor drive systems for generating the drive current of variable magnitude and frequency for driving an AC electric motor to produce a controllable rotation and torque.

Many variable frequency inverters, including the controlled current inverter, employ commutating capacitors to commutate automatically and sequentially the conduction controlled rectifying devices used in these inverters.

The automatic sequential commutation provided by the commutating capacitors is the result of the charges of appropriate magnitude and polarity, which are automatically built up on the commutating capacitors during the normal commutation of the conduction controlled rectifying devices in the inverter. In other words, the gating of the conduction controlled rectifying devices to the conduction state results in the build-up of charges of appropriate magnitudes and polarities on the commutating capacitors during normal operation to effect automatic commutation of the controlled rectifying devices.

Conventional variable frequency inverters employing commutating capacitors to provide automatic sequential commutation, however, exhibit several major deficiencies.

First, a charge of appropriate magnitude and polarity is not necessarily present on each of the commutating capacitors when the controlled current inverter is first started. The absence of the charges of appropriate magnitudes and polarities is due to the fact that the conduction controlled rectifying devices have not yet been gated. As stated above, these charges are caused to be built up during normal operation of the inverter.

The second major deficiency is that the charges of appropriate magnitude and polarity are bled from the commutating capacitors during conduction of the controlled rectifying devices and this bleeding becomes relatively more pronounced when the inverter is providing drive current at low frequency. This is especially critical when the inverter is providing drive current at substantially zero current and the initial charge on the capacitor is low at starting. In this case, because of the lack of sufficient charge, when the inverter is next called upon to commutate, the desired automatic sequential commutation desired from the commutating capacitors will not occur.

These and other deficiencies can prevent the inverter from producing the desired drive current of variable magnitude and frequency. This improper operation is particularly detrimental when the inverter is providing the drive current of variable magnitude and frequency to drive an AC electric motor for producing a desired rotation and torque. Failure of the motor to generate the desired rotation and torque means that the AC electric motor drive system can produce an undesirable output response.

OBJECTS OF THE INVENTION

It is an object of the present invention to provide a circuit and method for detecting the presence of charges of appropriate magnitude and polarity on the commutating capacitors of an inverter system that converts an incoming DC signal to a drive current of variable magnitude and frequency.

It is a further object of the present invention to provide a circuit and method for detecting the presence of charges of appropriate magnitude and polarity on the commutating capacitors of an inverter having a plurality of conduction controlled rectifying devices between each pair of which is connected a commutating capacitor.

It is another object of the present invention to provide a circuit and method for detecting the presence of charges of appropriate magnitude and polarity on the commutating capacitors of an inverter, having a plurality of conduction controlled rectifying devices between each pair of which is connected a commutating capacitor, by sensing the voltages across the conduction controlled rectifying devices.

It is a further object of the present invention to generate an output signal when the voltages across at least one of the conduction controlled rectifying devices of the inverter exceeds a first reference value and the magnitude of the DC output current to the inverter exceeds a second reference value, the absence of the output signal being effective to force the magnitude of the DC output current below a predetermined magnitude value and being effective to prevent the sequency of gating signals applied to the inverter.

These and other objects have been achieved by the circuit and method of the present invention.

SUMMARY OF THE INVENTION

A circuit and method is disclosed for detecting the presence of charges of appropriate magnitude and polarity on the commutating capacitors of an inverter that converts an incoming DC signal to a drive current of variable magnitude and frequency. The charges of appropriate magnitude and polarity on the commutating capacitors are sensed by measuring the voltages across the conduction controlled rectifying devices of the inverter. In addition, the current magnitude of the DC output current supplied to the inverter is also sensed. The inverter is effectively prevented from generating the drive current when the charges of appropriate magnitude and polarity are not present.

In one embodiment, the present invention is used in an AC electric motor drive apparatus having an AC electric motor producing a rotation in response to a drive current of variable magnitude and frequency. A rotation reference signal proportional to a desired level of rotation is established. An actual rotation signal is generated proportional to the rotation. A torque command signal is generated representative of any difference between the rotation reference signal and the actual rotation signal and is used to produce a frequency control signal and a current control signal as functions thereof. A variable DC current source provides a DC output current having a magnitude varied in response to the current control signal. An inverter supplies the drive current to the motor at a frequency controlled as a function of the frequency control signal (gating signals). The inverter has a plurality of conduction controlled rectifying devices having first power electrodes and second power electrodes. A link circuit connects the DC current source to the inverter. A first reference signal is provided at a predetermined level. A first control signal is provided when the voltage across the respective first and second power electrodes of at least one of the conduction controlled rectifying devices is greater than the first reference signal. An output signal is generated in response to the first control signal. The absence of the output signal is effective to force the magnitude of the DC output current below a predetermined magnitude value and is effective to prevent sequencing of the frequency control signals (gating signals to the inverter conduction controlled rectifying devices). The output signal is applied to electronic switches which cause the two system functions to occur.

In another version of the above embodiment, a second reference signal can be supplied at a predetermined level. A second control is provided when the magnitude of the DC output current is greater than the second reference signal. The output signal is generated in response to the first control signal and the second control signal. The magnitude of the DC output current can be sensed using a shunt.

In another embodiment, the present invention is used in an AC electric motor drive apparatus having an AC electric motor producing a rotation in response to a drive current of variable magnitude and frequency. A torque reference signal proportional to a desired level of torque is established. An actual rotation signal is generated proportional to the rotation. A torque command signal is generated in accordance with the torque reference signal and is used to produce a frequency control signal and a current control signal as functions thereof. A variable DC current source provides a DC output current having a magnitude varied in response to the current control signal. An inverter supplies the drive current to the motor at a frequency controlled as a function of the frequency control signal (gating signals). The inverter has a plurality of conduction controlled rectifying devices having first power electrodes and second power electrodes. A link circuit connects the DC current source to the inverter. A first reference signal is provided at a predetermined level. A first control signal is provided when the voltage across the respective first and second power electrodes of at least one of the conduction controlled rectifying devices is greater than the first reference signal. An output signal is generated in response to the first control signal. The absence of the output signal is effective to force the magnitude of the DC output current below a predetermined magnitude value and is effective to prevent generation of the frequency control signals (gating signals to the conduction controlled rectifying devices). The output signal is applied to electronic switches which cause the two system functions to occur.

In another version of the above embodiment, a second reference signal can be supplied at a predetermined level. A second control is provided when the magnitude of the DC output current is greater than the second reference signal. The output signal is generated in response to the first control signal and the second control signal. The magnitude of the DC output current can be sensed using a shunt.

DETAILED DESCRIPTION OF THE INVENTION

In many inverters for converting an incoming DC current signal to a drive current of variable magnitude and frequency, commutating capacitors are provided to produce automatic sequential commutation of the conduction controlled rectifying devices. In such inverters, a commutating capacitor is connected between each "pair" of conduction controlled rectifying devices in the inverter. A pair is defined herein as a unique set of two conduction controlled rectifying devices where the gating of one is intended to terminate the conduction of the other. Charges of appropriate magnitude and polarity are developed on the commutating capacitors such that the gating on of a non-conducting controlled rectifying device effects the commutation of a conducting device.

During normal operation of the inverter, charges of appropriate magnitude and polarity are automatically built up on the commutating capacitors. This automatic build-up of the charges is discussed in detail, as is a circuit and method for providing the charges when automatic build-up has not occurred, in U.S. Patent Application Ser. No. 32,859, entitled "Charging Circuit and Method for a Variable Frequency Inverter," to Loren H. Walker and John H. Cutler, filed on the same day as the present application, assigned to the assignee of the present invention and incorporated herein by reference. This automatic build-up of charges is now discussed to facilitate understanding of the present invention discussed below.

Figure 1:
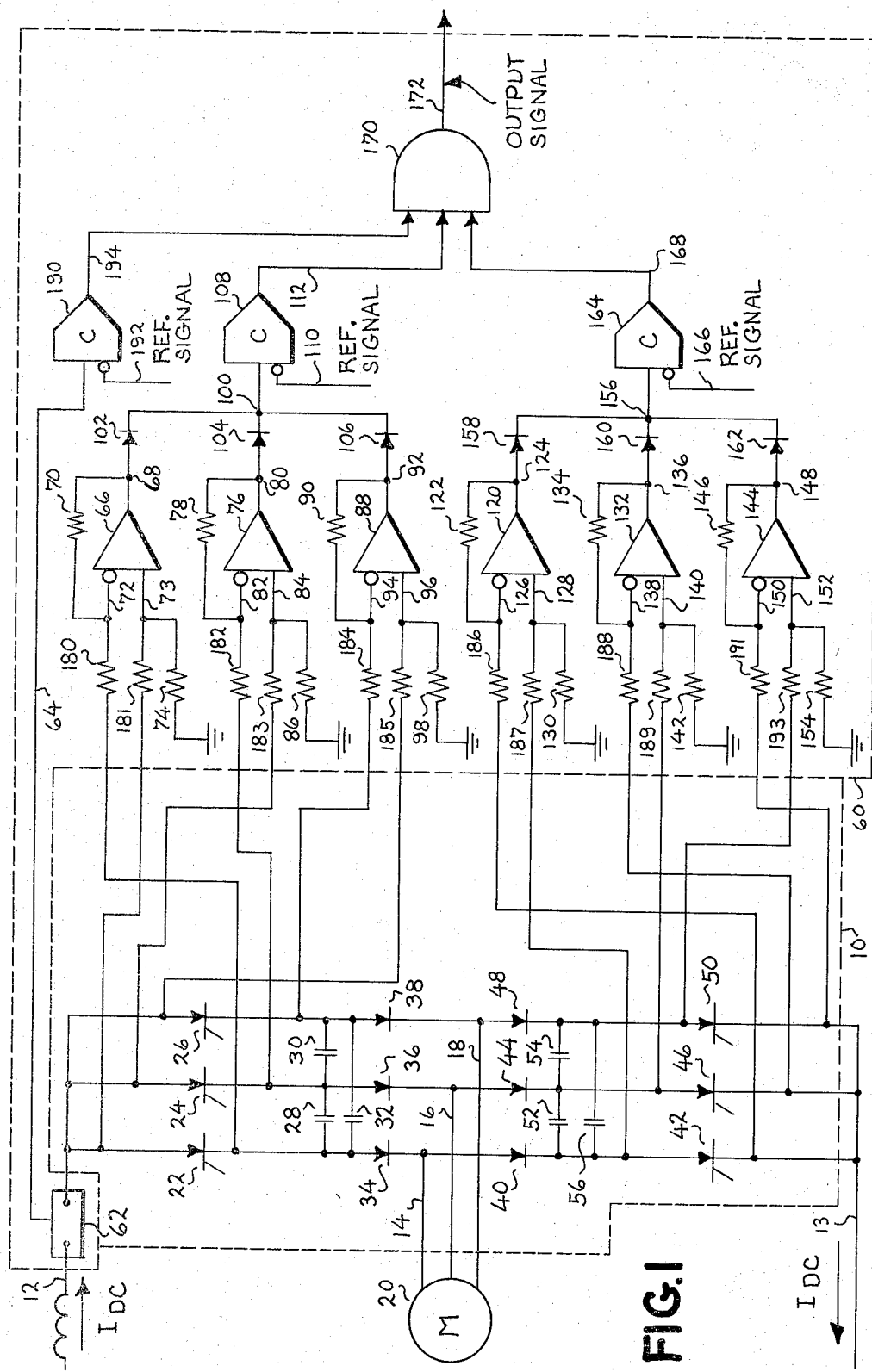
FIG. 1 is a schematic diagram of an inverter system for converting a DC output current to a drive current of variable magnitude and frequency, employing a plurality of conduction controlled rectifying devices between each pair of which is connected a commutating capacitor, which includes an embodiment of the circuit and method of the present invention utilized with the inverter.

Referring to FIG. 1, a typical inverter that converts an incoming DC current $I_{DC}$ to a drive current of variable magnitude and frequency is shown within dashed-line box 10. Inverter 10 is a three-leg, 6-thyristor bridge. It should be understood that the configuration of inverter 10 is only for purposes of illustration and that other types and sizes of inverters are equally suitable for utilizing the circuit and method of the present invention.

Inverter 10 converts an incoming DC current $I_{DC}$ on an incoming line 12 to a drive current of variable magnitude and frequency on output lines 14, 16 and 18, which is connected to a suitable load, such as an AC motor 20. Inverter 10, for example, as illustrated, has a positive half and a negative half.

As shown, the positive half includes a plurality of conduction controlled rectifying devices 22, 24 and 26. Conduction controlled rectifying devices 22, 24 and 26 can be of any suitable type including thyratrons or mercury arc rectifiers such as ignitrons and excitrons, but are preferably thyristors. Each conduction controlled rectifying device includes an anode, a cathode and a gate.

As is well known, a conduction controlled rectifying device is in the non-conducting state until the voltage on the anode is positive with respect to the cathode and an appropriate gating signal is applied to the gate. Thereafter, the conduction controlled rectifying device goes into the conducting state and remains in this state until the voltage on the cathode becomes positive with respect to the anode. Hereinafter, conduction controlled rectifying devices 22, 24 and 26 in the positive half are referred to as thyristors 22, 24 and 26, respectively.

A commutating capacitor is connected between the cathodes of each pair of thyristors in the positive half. Specifically, a commutating capacitor 28 is connected between the cathode of thyristor 22 and the cathode of thyristor 24. A commutating capacitor 30 is connected between the cathode of thyristor 24 and the cathode of thyristor 26. A commutating capacitor 32 is connected between the cathode of thyristor 22 and thyristor 26.

A blocking diode 34 is connected between the cathode of thyristor 22 and output line 14. A blocking diode 36 is connected between the cathode of thyristor 24 and output line 16, and a blocking diode 38 is connected between the cathode of thyristor 26 and output line 18. Blocking diodes 34, 36 and 38 can be of any suitable type.

As was stated above, charges of appropriate magnitude and polarity are built up on the commutating capacitors during normal operation of the inverter to produce automatic and sequential commutation of the thyristors. For the commutating capacitors in the positive half, the appropriate charges exist when there is a plus charge on each plate of the commutating capacitors connected to the conduction controlled rectifying device in the conducting state. In other words, the appropriate charges are present in the positive half when positive voltage differentials are present across the capacitors connected to the conduction controlled rectifying device in the conduction state.

To illustrate, when thyristor 24 is in the conduction state, appropriate charges are present when the voltage on the plates of commutating capacitors 28 and 30 connected to the cathode of thyristor 24 are positive with respect to their other plates connected to the cathodes of thyristors 22 and 26, respectively.

The negative half of inverter 10 is now explained. As was the case with the positive half of the inverter, any suitable conduction controlled rectifying devices can be used, but the preferable type is the thyristor. Hereinafter, the term "thyristor" will be used when a condition controlled rectifying device in the negative half is being referred to. The anode of a blocking diode 40 is connected to output line 14, and its cathode is connected to the anode of a thyristor 42. The cathode of thyristor 42 is connected to a return line 13, which is the return line through which the DC current signal $I_{DC}$ passes. The anode of a blocking diode 44 is connected to the output line 16, and its cathode is connected to the anode of a thyristor 46. The cathode of thyristor 46 is also connected to return line 13. Similarly, the anode of a blocking diode 48 is connected to output line 18, and its cathode is connected to the anode of a thyristor 50. The cathode of thyristor 50 is connected to return line 13.

A commutating capacitor is provided between the anodes of each pair of conduction controlled rectifying devices in the negative half. Specifically, a commutating capacitor 52 is connected between the anode of thyristor 42 and the anode of thyristor 46. A commutating capacitor 54 is connected between the anode of thyristor 46 and the anode of thyristor 50, and a commutating capacitor 56 is connected between the anode of thyristor 42 and the anode of thyristor 50.

The appropriate charge on commutating capacitors in the negative half of the inverter is a negative charge on the plates of the commutating capacitors connected to the anode of the thyristor in the conduction state. In other words, the charges of appropriate magnitude and polarity are present in the negative half when there is a negative voltage differential on the plates of the commutating capacitors connected to the anode of the thyristor in the conduction state.

For example, when thyristor 42 is in the conduction state, the appropriate charge would exist if the voltage potentials on the plates of commutating capacitors 52 and 56 connected to the anode of thyristor 42 were negative with respect to their other plates, and there was no voltage differential across the plates of commutating capacitor 54, which was not connected to the anode of thyristor 42.

The circuit and apparatus of the present invention is now discussed. The present invention generates an output signal when charges of appropriate magnitude and polarity are present on the commutating capacitors of the inverter, which output signal permits the inverter to generate normal drive current. The absence of the output signal indicates that charges of appropriate magnitude and polarity are not present. The absence of the output signal is effective to force the magnitude of the DC output current below a predetermined magnitude value and is effective to prevent generation of the frequency control signal, i.e., no gating signals are provided to the inverter.

In its most basic form, the present invention determines whether the charges of appropriate magnitude and polarity are present on the commutating capacitors by measuring the voltages between the anodes (first power electrodes) and cathodes (second power electrodes) of the conduction controlled rectifying devices of the inverter. The charges of appropriate magnitude and polarity are indicated when at least one of these voltages is greater than a reference voltage because the conduction controlled rectifying device in the conduction state effectively connects the commutating capacitors connected to it across the power electrodes of their respective conduction controlled rectifying devices not in the conduction state; thus, these voltages indicate the magnitude and polarity of the charges on these commutating capacitors. An output signal is not generated when none of these voltages is greater than the reference voltage. As stated above, the absence of the output voltage is effective to force the magnitude of the DC output current supplied to the inverter below a predetermined value and is effective to prevent generation of the frequency control signal. Thus, the absence of the output signal is effective to make the inverter inoperative so as not to provide normal drive current.

In some inverters, however, the presence of at least one voltage greater than the reference voltage does not indicate that the inverter is in the normal operative state. For example, such a condition is present when none of the conduction controlled rectifying devices is in the conduction state. Thus, in another form of the present invention, the magnitude of the DC output current $I_{DC}$ to the inverter is sensed and a voltage signal generated proportion to this magnitude value. The output signal is generated when at least one of the voltages across the conduction controlled rectifying devices is greater than the reference voltage and when voltage signal proportional to current magnitude of the DC output current $I_{DC}$ is greater than a reference voltage. The absence of the output signal serves the same function as it did with the basic form of the present invention discussed above. Other forms of the present invention examine the voltages across the conduction controlled rectifying devices of the positive half and examine the voltages across the conduction controlled rectifying devices of the negative half in addition to examining the current magnitude of the DC output current $I_{DC}$.

Referring again to FIG. 1, an embodiment of the circuit of the present invention is shown within dashed-line box 60.

The magnitude of the DC output current $I_{DC}$ supplied to inverter 10 by line 12 is sensed by a shunt 62. Shunt 62 provides a voltage signal on a line 64 having a magnitude proportional to the current magnitude of DC output current $I_{DC}$. Shunt 62, for example, may be a low resistance shunt of conventional design. Line 64 is connected to the non-inverting input of a comparator 190 of conventional design. The inverting input of comparator 190 is connected to a reference signal source 192, of conventional design, which supplies a reference voltage signal at a predetermined level. Comparator 190 provides a second control signal on an output line 194 when the level of the voltage signal on line 64 is greater than the predetermined level of source 192, indicating that at least one of the conduction controlled rectifying devices in the positive half and at least one of the conduction controlled rectifying devices in the negative half is in the conducting state.

A first control signal is provided when the voltage across at least one of the thyristors in the positive half of inverter 10 is greater than a reference signal. The voltage level across the commutating capacitors in the positive half can be measured by measuring the voltage between the anodes (first power electrodes) and cathodes (second power electrodes) of the conduction controlled rectifying devices. For example, when thyristor 24 is in the conduction state, commutating capacitor 28 is effectively connected across the anode and cathode of thyristor 22 and commutating capacitor 30 is effectively connected across the anode and cathode of thyristor 26. Commutating capacitor 32, which is not connected to the thyristor 23, is connected between the cathodes of the pair of thyristors 22 and 26 which are not in the conduction state. By measuring the voltage between the anode and cathode of thyristor 22 or by measuring the voltage between the anode and cathode of thyristor 26, the circuit and method of the present invention can determine whether a charge of appropriate magnitude and polarity exists on the commutating capacitors. The charge of appropriate magnitude and polarity is present when the voltage at the anode is positive with respect to the cathode of thyristor 22 or when the voltage at the anode is positive with respect to the cathode of thyristor 26.

An operational amplifier 66 of conventional design is connected to provide a difference output signal on an output line 68 proportional to the voltage between the anode and cathode of thyristor 22. Operational amplifier 66 is connected in a gain amplifier configuration with a feedback resistor 70 connected between output line 68 and an inverting input 72. The non-inverting input 73 is connected via a resistor 74 to electrical ground and is connected via a scaling resistor 181 to the anode of thyristor 22. The cathode of thyristor 22 is connected via a scaling resistor 180 to non-inverting input 72.

An operational amplifier 76 of conventional design is connected in gain amplifier configuration to provide a difference output signal on an output line 80 proportional to the voltage between the anode and cathode of thyristor 24. Similarly, an operational amplifier 88 of conventional design is connected in gain amplifier configuration to provide a difference output signal on an output line 92 proportional to the voltage across the anode and cathode of thyristor 26. The circuit configurations associated with operational amplifiers 76 and 88 are identical to that of operational amplifier 66 and are therefore not discussed in detail.

The positive cycles of the difference output signals on lines 68, 80 and 92 are respectively provided to and combined at a common node 100 by diodes 102, 104 and 106. The positive cycles of the difference signals at common node 100 are provided to a non-inverting input of a comparator 108 of conventional design. A reference signal at a predetermined level generated by a reference signal source 110 is supplied to the inverting input of comparator 108. Comparator 108 provides a first control signal on a line 112 which is in the high state when the level of the difference output signals at node 100 is greater than the reference signal provided by reference signal source 110. Thus, comparator 108 provides the first control signal when the voltage drop across at least one of the thyristors in the positive half is greater than the reference signal from reference signal source 110.

A third control signal is provided when the voltage across at least one of the commutating capacitors in the negative half of inverter 10 is greater than a reference signal. As is the case with the positive half of the inverter, the embodiment of the present invention shown in dashed-line box 60 determines whether charges of appropriate magnitude and polarity are present by measuring the voltage drops between the anode and cathode of the conduction controlled rectifying devices in the negative half.

For example, assume that thyristor 42 is in the conduction state. This causes commutating capacitor 52 to be connected between the anode and cathode of thyristor 46, and commutating capacitor 56 to be connected across the anode and cathode of thyristor 50.

Thus, by measuring the voltage between the anodes and cathodes of thyristors 46 and 50, the embodiment of the present invention within dashed-line box 60 can determine whether charges of appropriate magnitude and polarity are present on the commutating capacitors in the negative half of inverter 10.

An operational amplifier 120 of conventional design is connected to provide a difference output signal on an output line 124 proportional to the voltage between the anode and cathode of thyristor 42. Operational amplifier 120 is connected in a gain amplifier configuration with a feedback resistor 122 connected between output line 124 and an inverting input 126. The non-inverting input 128 is connected via a resistor 130 to electrical ground and is also connected via a scaling resistor 187 to the anode of thyristor 42. The cathode of thyristor 42 is connected via a scaling resistor 186 to non-inverting input 126.

An operational amplifier 132 of conventional design is connected in gain amplifier configuration to provide a difference output signal on an output line 136 proportional to the voltage between the anode and cathode of thyristor 46. Similarly, an operational amplifier 144 of conventional design is connected in gain amplifier configuration to provide a difference output signal on an output line 148 proportional to the voltage between the anode and cathode of thyristor 50. The circuit configurations of operational amplifiers 132 and 144 are identical to the configuration of operational amplifier 120 and are therefore not discussed in detail.

The positive cycles of the difference output signals on lines 124, 136 and 148 are respectively provided to and combined at a common node 156 by diodes 158, 160 and 162. Diodes 158, 160 and 162 can be of any suitable type for providing the positive cycles.

The positive cycles of the difference signals on node 156 are provided to a non-inverting input of a comparator 164. A reference signal 166, at a predetermined level, is provided to an inverting input of comparator 164. Comparator 164 provides a third control signal which is in the high state when the voltage level of the difference signals on node 156 is greater than the reference signal from reference signal source 166. Thus, it is seen that comparator 164 provides the third control signal when the voltage drop across at least one of the conduction controlled rectifying devices in the negative half of the inverter is greater than the predetermined level of reference signal 166.

The second control signal on line 194, the first control signal on line 112, and the third control signal on line 168 are provided to a logic stage 170. Logic stage 170 generates the output signal on a line 172 in response to the first, second and third control signals. A suitable form for logic stage 170 is an AND gate. It should also be understood, however, that a NAND gate can be used in lieu thereof when the absence of the first, second and third control signal indicates that the output signal should be generated.

The output signal on line 172 is effective to allow inverter 10 to generate normal drive current. The absence of the output signal is effective to force the magnitude of the DC output current below a predetermined magnitude value and is effective to prevent sequencing of the frequency control signal. Illustrations of the manner in which this invention may be employed are disclosed in the specific embodiments to be described with respect to FIGS. 2 and 3.

The present invention has particular applicability for use in an AC electric motor drive system employing an inverter to provide a drive current of variable magnitude and frequency to an AC electric for producing a controllable rotation and torque.

Figure 2:
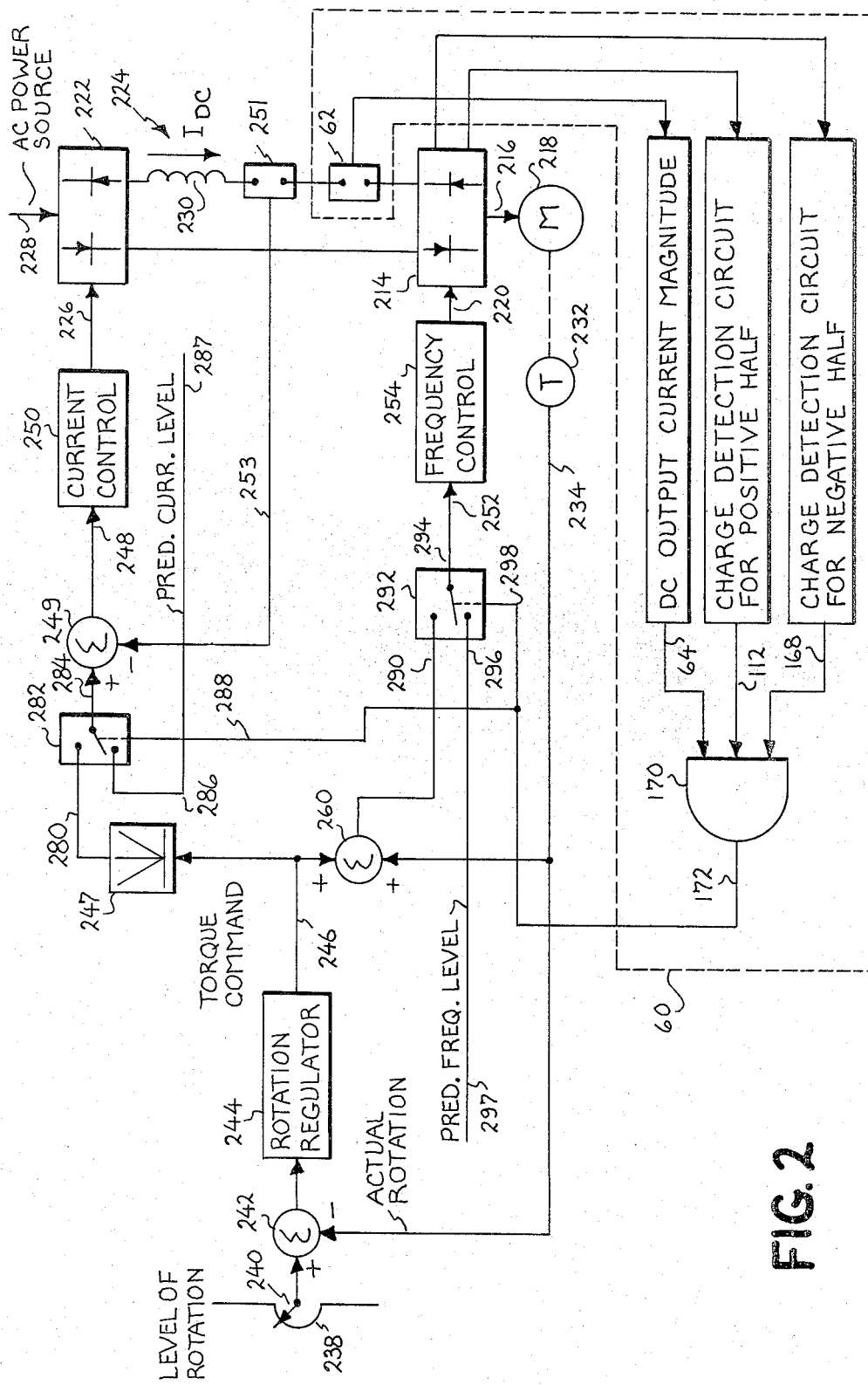
FIG. 2 is a schematic block diagram of an embodiment of the commutating capacitor charge detection circuit and method of the present invention used with an inverter employed in an AC electric motor drive system using a desired level of rotation.

FIG. 2 is a schematic block diagram of a suitable AC electric motor drive system in which the commutating capacitor charge detection circuit and method of the present invention can be used. The detection circuit of the present invention of the embodiment of FIG. 1 is shown in block diagram form within a dashed-line box 60; the circuitry outside box 60 is an AC electric motor drive system employing a desired level of rotation command. The commutating capacitor charge detection circuit and method of the present invention can be utilized in other types of electric drive systems.

The system shown in FIG. 2 is only for purposes of illustration, and is similar to the system disclosed and claimed in U.S. patent application Ser. No. 895,189, entitled "Controlled Current Inverter and Motor Control System," to P. M. Espelage et al, filed Apr. 10, 1978, assigned to the assignee of the present invention, and incorporated herein by reference. Another suitable electric drive motor system is shown in A. B. Plunkett, D'Atre, J. D., Lipo, T. A., "Synchronous Control of a Static AC Inductor Motor Drive," *IEEE/IAS Annual Meeting Conference Record,* 1977, pages 609–15.

Referring to FIG. 2, a variable frequency inverter 214 provides a drive current of variable magnitude and frequency via a line 216 to a load, such as AC motor 218. AC motor 218 can be of any suitable type, but preferably is an AC induction motor.

Inverter 214 can be of any suitable type for converting a DC output channel $I_{DC}$ to a drive current of variable frequency under control of a frequency control signal on an input line 220. One preferable form for inverter 214 is an autosequentially commutated controlled current inverter 10 of FIG. 1 having a 6-thyristor bridge, which generates the drive current of variable magnitude and frequency in accordance with the controlled gating of the thyristors. As such, inverter 214 (inverter 10 of FIG. 1) has a positive half and a negative half and circuit 60 of the present invention detects whether charges of appropriate magnitude and polarity are present on the commutating capacitors by measuring the voltages across the respective conduction controlled rectifying devices in the manner set forth above. In addition, the circuit of the present invention also measures the current magnitude level of the output current $I_{DC}$ using shunt 62 in the manner set forth above.

The DC output current $I_{DC}$ to inverter 214 (FIG. 2), can be provided by any suitable variable DC current source. One preferred embodiment for the variable DC current source is a converter 222, which supplies variable magnitude DC current $I_{DC}$ via a DC link 224 to the input of inverter 214. Converter 222 converts AC power 228, under control of a current control signal on a line 226, to a DC current $I_{DC}$ of variable magnitude. Converter 222 can be of any suitable type but, most typically, would be a 6-thyristor phase controlled converter whose thyristors are provided with gating pulses in response to the current control signal on line 226.

The DC current $I_{DC}$ of variable magnitude is provided to inverter 214 via DC link 224. DC link 224 can take any suitable form, but preferably includes an inductor 230 connected in series between converter 222 and inverter 214. Inductor 230 acts as a filter.

Thus, the magnitude of the drive current supplied by inverter 214 to line 216 is controlled by the current control signal supplied to converter 222, and the frequency of the drive current is varied in accordance with the frequency control signal furnished on line 220 to inverter 214.

The electric motor drive system shown in FIG. 2 is a closed loop system having the following feedback paths. The actual rotation produced by motor 218 is sensed and used to generate an actual rotation signal on a line 234 proportional to the mechanical rotation. One suitable form for generating the actual rotation signal is a DC tachometer 232. Other approaches for generating the actual rotation signal are contemplated by this invention.

A desired level of rotation is used to establish a rotation reference signal proportional thereto. The desired level of rotation can be furnished from either a system or user command; and most typically is in the form of a rotation user command from an operator settable rheostat 238 having a wiper arm 240 connected to a user or operator rotation control level (not shown).

The rotation reference signal from wiper arm 240 is provided to a first input of a summing junction 242. The actual rotation signal is negatively fed back and provided to a second input of summing junction 242. The output of summing junction 242 is a rotation difference signal, representative of any difference between the rotation reference signal and the actual rotation signal, and is provided to the input of a rotation regulator 244. Rotation regulator 244 can be of any suitable type to generate on a line 246 a torque command signal as a function of the rotation difference signal. One suitable form for rotation regulator 244 is an operational amplifier configured to operate as a gain amplifier having, for example, a transfer function of $$k \frac{1 + st}{s},$$

where s is a LaPlace operator, t is a time constant, and k is a gain constant.

The torque command signal is applied via line 246 to the input of an absolute value stage 247 of conventional design. The absolute value version of the torque command signal at the output of absolute value stage 247 is applied to the first input of a summer 249 via switch 282 which normally connects terminal 280 to terminal 284. A shunt 251 is mounted to sense the magnitude of the DC current $I_{DC}$ through inductor 230. Shunt 251 provides on a line 253 a signal indicative of this magnitude level. The signal on line 253 is negatively fed back and provided to a second input of summer 249. The output of summer 249 provides to current control 250 a signal representative of any difference between the absolute value version of the torque command signal and the signal indicative of the magnitude of the DC output current $I_{DC}$.

Electronic switch 282 is part of the present invention and normally connects an output contact 284 with a contact 280. Contact 286 is connected to a source 287 supplying a predetermined current level signal effective to force the level of the DC output current $I_{DC}$ supplied by converter 222 below a predetermined magnitude value. Source 287 is of conventional design, such as a reference voltage. Electronic switch 282 is adapted to switch output contact 284 to contact 280 when the output signal from the present invention is furnished via line 172 to a switching input 288. Electronic switch 282 can be of any suitable type, such as a bipolar transistor or field effect transistor switch or an electromechanical relay.

Output contact 284 is connected to an input 248 of a current control stage 250. Current control stage 250 can be of any suitable type for generating the current control signal on line 226 in accordance with the signal at input 248. One suitable form for current control stage 250 is that of a ramp and pedestal gating control of conventional design.

The torque command signal on line 246 is also applied to the first input of a summer 260 of conventional design. The actual rotation signal is positively fed back and provided to a second input of summer 260. The output of summer 260, which is a signal proportional to the sum of the torque command signal and the actual rotation signal, is provided to a contact 290 of an electronic switch 292.

Electronic switch 292 is part of the present invention and normally connects an output contact 294 to a contact 290. Contact 290 is connected to a source 297 supplying a predetermined frequency level signal effective to generate a frequency control signal equivalent to zero, i.e., no change in gating signals is provided on line 220 to inverter 214. Source 297 is of conventional design. For example, source 297 can effectively connect contact 296 to system ground. Electronic switch 292 is adapted to switch output contact 294 to contact 290 when the output signal from the present invention is furnished via line 172 to a switching input 298. Electronic switch 292 can be of any suitable type, such as a bipolar transistor or field effect transistor switch or an electromechanical relay.

Output contact 294 is connected to an input 252 of a current control stage 254. Frequency control stage 254 can be of any suitable type for generating the frequency control signal as a function of the signal proportional to the sum of the torque command signal and the actual rotation signal. The frequency control signal is provided to inverter 214 via line 220. One suitable form for frequency control stage 254 is that of a voltage controlled oscillator and a non-recirculating shift register disclosed and claimed in U.S. patent application Ser. No. 32,859, entitled "Inverter Power Conversion System Having Improved Control Scheme," to Loren H. Walker et al, filed on the same day as the present application, assigned to the assignee of the present application, and incorporated herein by reference. Another suitable form for frequency control stage 254 is that of a voltage controlled oscillator and a ring counter.

The drive system shown in FIG. 2 allows the mechanical rotation and torque generated by AC induction motor 218 to be controlled in accordance with the desired level of rotation. The commutating capacitor charge detection circuit and method of the present invention has particular applicability in AC electric motor drive systems for automatically preventing an attempt to generate normal drive current when charges of appropriate magnitude and polarity are not present on the commutating capacitors of the inverter.

Figure 3:
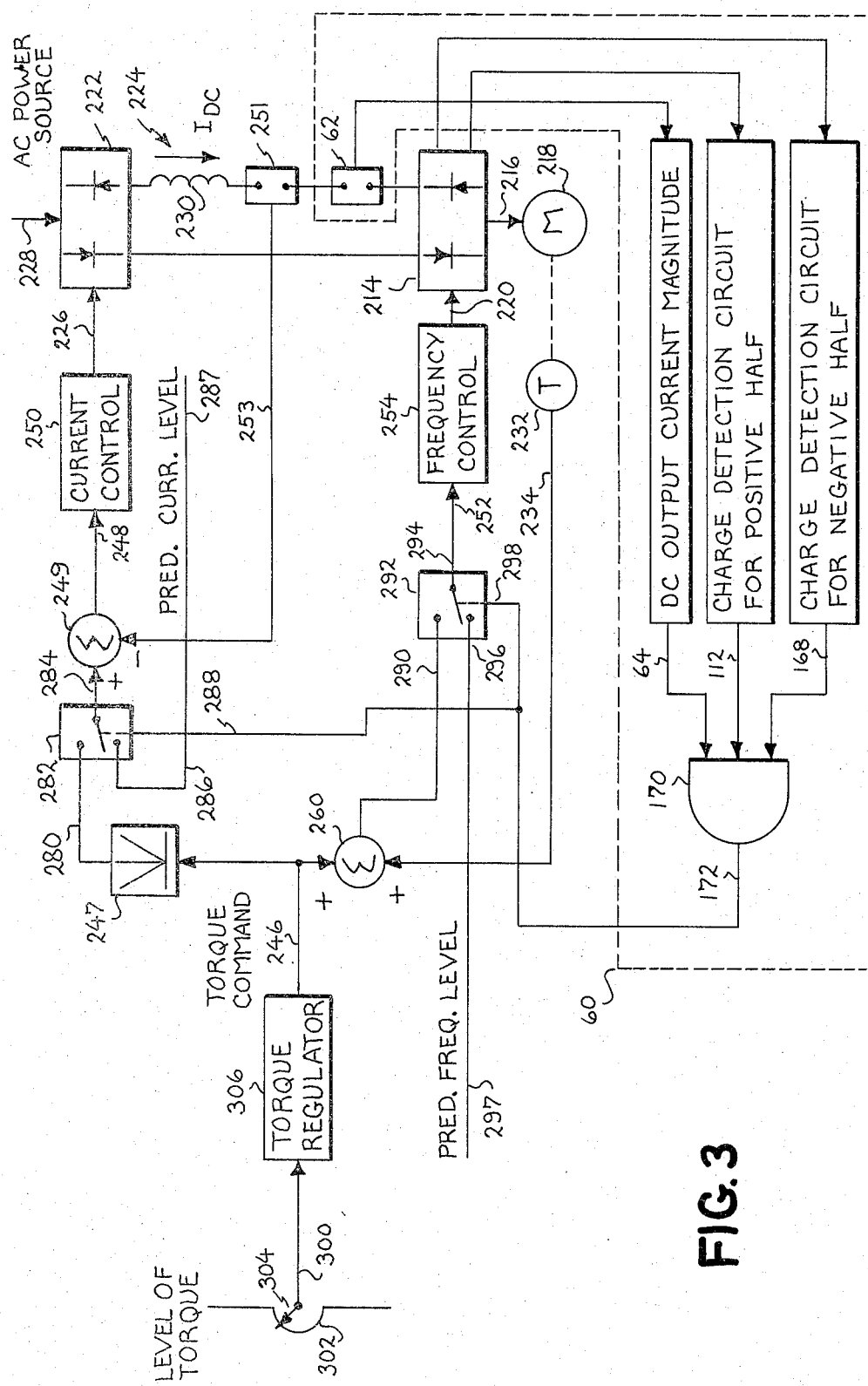
FIG. 3 is a schematic block diagram of an embodiment of the commutating capacitor charge detection circuit and method of the present invention used with an inverter employed in an AC electric motor drive system using a desired level of torque.

Referring to FIG. 3, a preferred embodiment of the commutating capacitor charge detection circuit and method of the present invention for use in an AC electric motor drive system employing a desired level of torque command is shown in block form in dashed-line box 60. The description presented above with respect to box 60 is equally applicable here. The conventional AC electric motor drive system employing a desired level of torque command shown in FIG. 3 is outside of the dashed-line box 60, and is similar to the drive system disclosed in the P. M. Espelage patent application, U.S. patent application Ser. No. 895,189, discussed above. Like numbers in FIGS. 2 and 3 correspond to identical components; only different components are discussed herein.

A torque reference signal proportional to a desired level of torque is provided on a line 300. This torque reference signal can be provided by the drive system, or can be furnished by an operator settable rheostat 302 having a wiper arm 304. The position of the wiper arm 304 corresponds to the desired level of torque indicated by the position of a user torque lever (not shown).

The torque reference signal is provided as an input to a torque regulator 306, which generates the torque command signal on line 246 as a function of the torque reference signal. The torque regulator 306 can be of any suitable type to generate the torque command signal in accordance with the torque reference signal. One suitable form for torque regulator 306 is an operational amplifier of conventional design configured to operate as an amplifier exhibiting a suitable gain. The remaining components of the conventional drive system shown in FIG. 3 correspond to the like numbered components of the conventional drive system shown in FIG. 2.

While there have been shown and described what are at present considered to be the preferred embodiments of the present invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

What is claimed is:

1. An electric motor drive apparatus having an AC electric motor producing a rotation in response to a drive current of variable magnitude and frequency comprising:
   (a) means for establishing a rotation reference signal proportional to a desired level of rotation;
   (b) means for generating an actual rotation signal proportional to said rotation;
   (c) means for generating a torque command signal representative of any difference between said rotation reference signal and said actual rotation signal, and for producing a frequency control signal and a current control signal as functions of said torque command signal;
   (d) a variable DC current source for providing a DC output current having a magnitude varied in response to said current control signal;
   (e) inverter means for supplying said drive current to said motor at a frequency controlled as a function of said frequency control signal and having a plurality of conduction controlled rectifying devices having first power electrodes and second power electrodes;
   (f) link circuit means for connecting said DC current source to said inverter means;
   (g) means for providing a first reference signal at a predetermined level;
   (h) means for providing a first control signal when the voltage across the respective first and second power electrodes of at least one of the conduction controlled rectifying devices is greater than said first reference signal; and
   (i) means responsive to said first control signal for generating an output signal, the absence of which being effective to force said magnitude of said DC output current below a predetermined magnitude value and being effective to prevent generation of said frequency control signal.

2. The electric motor drive apparatus of claim 1, further comprising means for supplying a second reference signal at a predetermined level,
   further comprising means for providing a second control signal when the magnitude of said DC output current is greater than said second reference signal, and
   wherein said means for generating an output signal generates said output signal in response to said first control signal and said second control signal.

3. The apparatus of claim 1, wherein said means for providing a first control signal comprises:
   (a) means for furnishing a plurality of difference signals which are respectively proportional to the voltages between first and second power electrodes of said conduction controlled rectifying devices; and
   (b) means for generating said first control signal when the level of said difference signals exceeds said first reference signal.

4. The apparatus of claim 3, wherein said means for providing a first control signal further comprises:
   (a) rectifying means connected between said means for furnishing a plurality of difference signals and said means for generating said first control signal for passing the positive cycles of each of said difference signals.

5. The apparatus of claim 4, wherein said conduction controlled rectifying devices comprise thyristors each having an anode and a cathode, and
   wherein said difference signals are respectively proportional to the voltages between said anodes and cathodes of said thyristors.

6. The apparatus of claim 2, wherein said means for providing a second control signal comprises:
   (a) a shunt mounted with respect to said variable DC current source for providing a current level signal proportional to said magnitude of said DC output current; and
   (b) comparator means for providing said second control signal when said current level signal is greater than said second reference signal.

7. The apparatus of claim 1, further comprising electronic switch means for normally causing said current control signal to be produced as a function of said torque command signal and adapted for causing said current control signal to be generated at a predetermined level in absence of said output signal.

8. The apparatus of claim 1, further comprising electronic switch means for normally causing said frequency control signal to be produced as a function of said torque command signal and adapted for causing said frequency control signal not to be generated in absence of said output signal.

9. The apparatus of claim 1, wherein said means for establishing a rotation reference signal establishes a torque reference signal proportional to a desired level of torque, and
   wherein said means for generating a torque command signal generates said torque command signal in response to said torque reference signal.

10. The electric motor drive apparatus of claim 9, further comprising means for supplying a second reference signal at a predetermined level, further comprising means for providing a second control signal when the magnitude of said DC output current is greater than said second reference signal, and wherein said means for generating an output signal generates said output signal in response to said first control signal and said second control signal.

11. The apparatus of claim 9, wherein said means for providing a first control signal comprises:

(a) means for furnishing a plurality of difference signals which are respectively proportional to the voltages between first and second power electrodes of said conduction controlled rectifying devices; and (b) means for generating said first control signal when the level of said difference signals exceeds said first reference signal.

12. The apparatus of claim 11, wherein said means for providing a first control signal further comprises:

(a) rectifying means connected between said means for furnishing a plurality of difference signals and said means for generating said first control signal for passing the positive cycles of each of said difference signals.

13. The apparatus of claim 12, wherein said conduction controlled rectifying devices comprise thyristors each having an anode and a cathode, and wherein said difference signals are respectively proportional to the voltages between said anodes and cathodes of said thyristors.

14. The apparatus of claim 10, wherein said means for providing a second control signal comprises:

(a) a shunt mounted with respect to said variable DC current source for providing a current level signal proportional to said magnitude of said DC output current; and (b) comparator means for providing said second control signal when said current level signal is greater than said second reference signal.

15. The apparatus of claim 9, further comprising electronic switch means for normally causing said current control signal to be produced as a function of said torque command signal and adapted for causing said current control signal to be generated at a predetermined level in absence of said output signal.

16. The apparatus of claim 9, further comprising electronic switch means for normally causing said frequency control signal to be produced as a function of said torque command signal and adapted for causing said frequency control signal not to be generated in absence of said output signal.

17. A method for an electric motor drive having an AC electric motor producing a rotation in response to a drive current of variable magnitude and frequency, which method comprising the steps of:

(a) establishing a rotation reference signal proportional to a desired level of rotation;

(b) generating an actual rotation signal proportional to said rotation;

(c) generating a torque command signal representative of any difference between said rotation reference signal and said actual rotation signal;

(d) producing a frequency control signal and a current control signal as functions of said torque command signals;

(e) providing a DC output current having a magnitude varied in response to said current control signal;

(f) supplying using an inverter said drive current at a frequency controlled as a function of said frequency control signal, said inverter having a plurality of conduction controlled rectifying devices having first power electrodes and second power electrodes;

(g) connecting said DC output current to said inverter;

(h) providing a first reference signal at a predetermined level;

(i) providing a first control signal when the voltage between the respective first and second power electrodes of at least one of said conduction controlled rectifying devices is greater than said first reference signal; and (j) generating an output signal in response to said first control signal, the absence of said output signal being effective to force said magnitude of said DC output current below a predetermined magnitude value and being effective to prevent generation of said frequency control signal.

18. The method of claim 17, further comprising the step of supplying a second reference signal at a predetermined level, further comprising the step of providing a second control signal when the magnitude of said DC output signal is greater than said second reference signal, and wherein said step of generating an output signal generates said output signal in response to said first control signal and said second signal.

19. The method of claim 17, wherein said step of establishing a rotation reference signal establishes a torque reference signal proportional to a desired level of torque, and wherein said step of generating a torque command signal generates said torque command signal in response to said torque reference signal.

20. The method of claim 19, further comprising the step of supplying a second reference signal at a predetermined level, further comprising the step of providing a second control signal when the magnitude of said DC output signal is greater than said second reference signal, and wherein said step of generating an output signal generates said output signal in response to said first control signal and said second control signal.

* * * * *